United States Patent [19]

Yoshiike et al.

[11] Patent Number: 5,003,324

[45] Date of Patent: Mar. 26, 1991

[54] THERMAL HEAD

[75] Inventors: Nobuyuki Yoshiike, Ikoma; Atsushi Nishino, Neyagawa; Akihiko Yoshida; Yoshihiro Watanabe, both of Osaka; Yasuhiro Takeuchi, Hirakata; Hisashi Kodama, Ikoma, all of Japan

[73] Assignee: Matsushita Electric Industrial Co., Ltd., Osaka, Japan

[21] Appl. No.: 391,611

[22] PCT Filed: Nov. 17, 1988

[86] PCT No.: PCT/JP88/01160

§ 371 Date: Jul. 14, 1989

§ 102(e) Date: Jul. 14, 1989

[87] PCT Pub. No.: WO89/04767

PCT Pub. Date: Jun. 1, 1989

[30] Foreign Application Priority Data

| | | | |
|---|---|---|---|
| Nov. 19, 1987 | [JP] | Japan | 62-292327 |
| Feb. 20, 1988 | [JP] | Japan | 63-38951 |

[51] Int. Cl.⁵ .......... G01D 15/10

[52] U.S. Cl. .......... 346/76 PH

[58] Field of Search .......... 219/216 PH; 346/76 PH

[56] References Cited

FOREIGN PATENT DOCUMENTS

| | | |
|---|---|---|
| 0068270 | 4/1984 | Japan . |
| 60-5842 | 1/1985 | Japan . |
| 0211058 | 9/1986 | Japan . |

*Primary Examiner*—Bruce A. Reynolds

*Assistant Examiner*—Huan Tran

*Attorney, Agent, or Firm*—Wenderoth, Lind & Ponack

[57] ABSTRACT

The present invention has an electrode for energization use of a thermal head having an unprecedentedly new electrode construction of a full peripherally surrounding type, so that one heating portion corresponds to one individual electrode without separation or independence of a heating resistor. Thus, the heating efficiency in the printing operation is improved to increase the thermal response property, thus making it possible to save the power. Furthermore, the full periphery surrounding electrode portion is adapted to be completely covered by the heating resistor to remove the dispersion of the resistance values of each dot responsible for the dispersion of the printing width of the heating resistor, and to completely provide uniformity by an energization overload trimming system. The heating efficiency and the thermal response property are improved, and the uneven printing concentration of each dot is removed to make the gradation recording property better, thus making it possible to have an embodiment of a thermal head capable of high-quality printing and having high reliability.

14 Claims, 4 Drawing Sheets

THERMAL HEAD

BACKGROUND OF THE INVENTION:

The present invention generally relates to a thermal head which is used in a thermal transfer recording apparatus, a heat sensitive recording apparatus, etc. for printers, facsimiles, etc.

Conventionally, the thermal transfer recording apparatus and the heating sensitive recording apparatus for printers, facsimiles, etc. effect the heat sensitive recording with respect to a heat sensitive paper or an ordinary paper with an ink sheet superposed thereon by the use of a thermal head. The thermal head to be used in printing apparatuses such as a thermal transfer apparatus, thermally sensitive printing types of printers, etc. is two in types as follows. A first one is a so-called thin membrane type, wherein heating resistors, electrodes for energization use and abrasion-proof layers are formed by a vacuum thin membrane forming process such as evaporation, sputtering on a glaze-alumina base plate so as to form patterns by the use of a photolitho etching method. A second one is named so-called thick membrane type, wherein electrodes for energization use, heating resistors, and abrasion-proof layers are respectively formed on a glaze-insulation base plate by the printing burning of the paste.

The above-described two types of thermal heads have advantages and disadvantages respectively. Namely, as the thin membrane type of thermal head is uniform in its resistor shape (area, thickness, etc.) among the respective dots, with its thermal capacity being uniform, the heat transfer into the paper is uniformly effected during the printing operation. Also, as the resistance values of the respective resistors are obtained uniformly up to some extent, and the thermal head is collectively superior in the print quality. As the thickness of the resistor is as thin as 1000 to 5000 Å, the thermal capacity is smaller, with the constant becoming superior, the print heating efficiency becoming higher during the rising and falling operations of the resistor temperature during the on and off pulse application. However, in the conventional thin membrane type, it is difficult to have the dispersion of the resistance value at ±5% or lower, so that a more superior print quality is hard to obtain. Also, there are many problems to be solved in terms of productivity, lower cost such as facility cost, batch production, etc. for the thin membrane process.

On the other hand, it is noteworthy that the thick membrane type of thermal head has many advantages such as lower facility cost and easier continuous production, because it uses a print burning method.

FIG. 5 is a construction view of the conventional thick membrane type of thermal head. A glaze layer 2 is formed on the top face of an alumina base plate 1. A common electrode 3, an individual electrode 4 and a heating resistor 5 are formed on it, with an abrasion layer 6 being provided to cover the respective one portion of the heating resistor 5, the electrodes 3, 4.

FIG. 6 is a plan view showing the electrode shape of the conventional thick membrane type of thermal head. As it is difficult to independently constitute the heating resistor in the thick membrane type of thermal head, a line-shaped common heating resistor 5 is provided, with the conductive electrodes for energization use 3 and 4 having the common electrode 3 and the individual electrode 4 introduced and exposed in a zigzag shape, alternately from both the sides of the heating resistor 5. Also, one dot is constructed in one individual electrode 4, with two heating portions 7*a* and 7*b* being provided correspondingly. Namely, upon the application of voltage in pulse upon between one individual electrode 4 and a common electrode 3,, a current flows at the same time to the heating portions 7*a* and 7*b* to form two color forming points.

Conventionally the resistor values of the heating member of the thick membrane type thermal head having the electrode shape of the zigzag type have the dispersion of ten-odd percent in a plurality of dots within the sam head. The major causes for the resistance value dispersion lay in nonuniformity in the dispersion condition, etc. of the heating resistor material, and printing accuracy in uniformity, etc. of the line width, thickness of the line-shaped common heating resistor 5. Namely, in the thick membrane type of thermal head, it is difficult to uniformly print the line width of the line-shaped common heating resistor 5 enough to have several percent of dispersion, so that the contact area between the electrodes 3 and 4 for energization use introduced, disposed from both the sides of the heating resistor 5 and the heating resistor 5 is different, thus resulting in fundamentally increasing the dispersion of the respective dot resistance values.

Therefore, the resistance value of the dot may be uniformly adjusted into approximately ±1% through a trimming operation by the use of an energization overload trimming system (a method of using the resistance value variation through self-generating Joule heat to be caused when the power is fed into the heating resistor), but the calorific value per unit value of the heating resistor can not be made uniform.

SUMMARY OF THE INVENTION

Accordingly, an essential object of the present invention is to provide a thermal head, the invention relating to an energization electrode shape of the thermal head, characterized in that the electrode shape has a construction of an approximately full periphery surrounding type of electrode unprecedentedly new, with the object of improving the heating efficiency in the printing to improve the thermal response properties and to save the power. Namely, it is possible to correspond one heating portion with respect to on individual electrode without the separation and independence of the heating resistor.

Another important object of the present invention is to provide a thermal head of the above-described type, which is characterized in that the approximately full periphery surrounding type of electrode portion is adapted to be completely covered by the heating resistor to remove the dispersion of the respective dot resistance value responsible for the dispersion of the printing width of the heating resistor, and to arrange it completely uniform by the energization overload trimming system.

The above-described effects may provide a thermal head which is better in heating efficiency, thermal response property, is capable of high-quality printing by the improvements in toner recording property through the removal of uneven printing concentration of the respective dots, and is extremely reliable.

BRIEF DESCRIPTION OF THE DRAWINGS

The above and other objects and features of the present invention will become apparent from the following description taken in conjunction with the preferred embodiment thereof with reference to the accompanying drawings, in which.

DETAILED DESCRIPTION OF THE INVENTION

Figure 1:
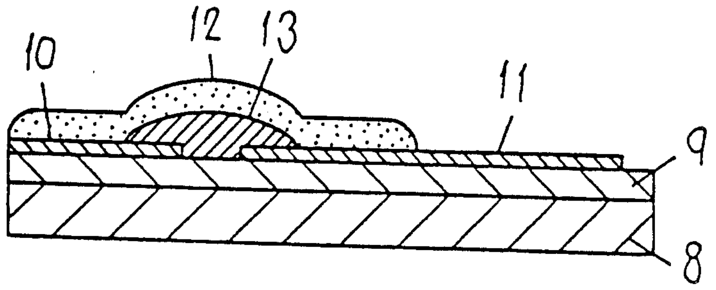
FIG. 1 is a sectional schematic view of a thermal head in one embodiment of the present invention.

Before the description of the present invention proceeds, it is to be noted that like parts are designated by like reference numerals throughout the accompanying drawings.

Embodiment 1

Figure 2:
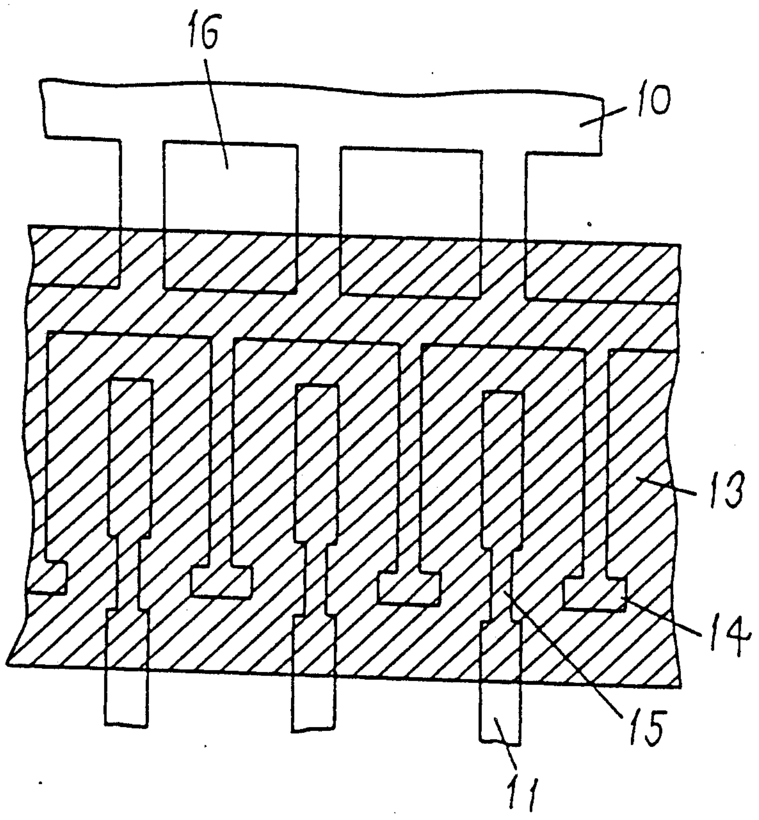
FIG. 2 through FIG. 4 show a plan view showing an electrode construction thermal head.

As shown in the sectional construction view of FIG. 1, and in the plan view of FIG. 2, a common electrode 10 and an individual electrode 11 made of a gold conductor (0.5 through 1.0 μm in thickness) are provided at an interval of dot pitch (16.7 μm) on an alumina base plate 8 with a glaze layer 9 provided thereon. The electrode construction at this time is one wherein the power introduction portion of the common electrode 10 is disposed on approximately the full periphery of the power introduction portion of the individual electrode 11 as shown in FIG. 2, namely is an electrode construction of an approximately full periphery surrounding type. The heating resistor 13 (4 through 8 μm in thickness), mainly made of Ru02, is print-burned in line shape (350 μmin width), with the heating resistor 13 being formed on the opposite portion of the electrode group. A glass layer is burned so as to cover one portion of the resistor and the electrode group, so that an abrasion-proof layer 12 (4 through 8 μm) in thickness is formed.

The resistor values of respective heating portions to be formed between the opposite common electrode 10 and the individual electrode 11 after the head formation are 1500Ω±7%, although they are different in the electrode width of the opposite portion. It is to be noted that the end portion of the common electrode 10 is swollen into a common electrode swollen portion 14, with one portion of the individual electrode 11 having a narrow portion 15. The reference numeral 16 is a hollow portion disposed in one portion of the common electrode.

By the use of the energization overload trimming method for adjusting the resistor value through the self-generating Joule heat of the heating resistor, the pulse voltage (5 through 150 V, several μs) is energized for an optional time period onto the respective heating portion to be formed between the electrodes of a pair of opposite common electrode 10 and the individual electrode 11 so as to separately adjust the resistor values of the respective heating portions for the arrangement of the resistor values of all the heating portions within ±1%.

The conventional head with only the electrode pattern being supposed to be the conventional zigzag type of electrode pattern for comparison of the head is driven on the conditions of 0.4 W/Dot, ¼ duty, 16 ms/cycle to print on heat sensitive paper. According to the results of the concentration of the color forming point of the respective dot measured by a micro densitometer, the conventional head has a dispersion of ±5% or more in the concentration of the color forming point, while the head of the present invention has the dispersion within ±2%, thus allowing the extremely high quality of printing operation.

It has been found that the head with the construction of the end portion of the electrode of the electrode group for introducing the heating power into the heating member having the construction of the electrode of an approximately full periphery surrounding type is 1.2 times as high in the printing concentration as compared with the head of conventional simple zigzag type of electrode pattern, and is superior in the thermal response properties. Also, the printing condition in the actual printing allows the extremely high quality of printing to be effected as compared with the conventional simple zigzag type of head, because the color formation of the first line is clear.

Figure 3A:
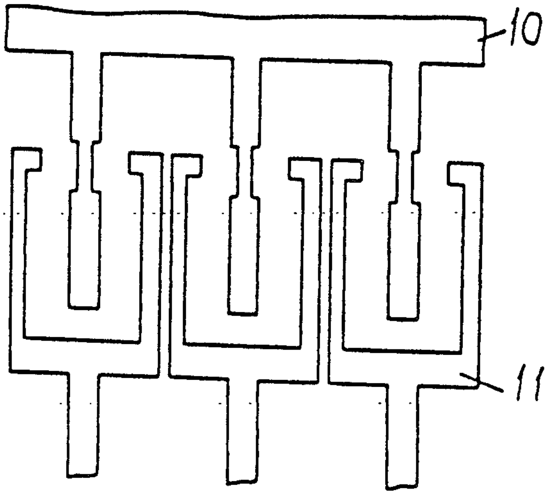
Figure 3B:
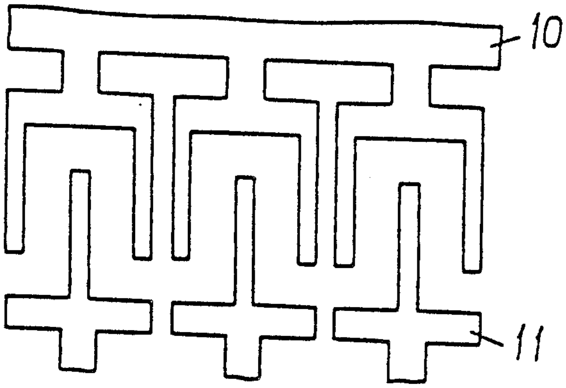
Figure 3C:
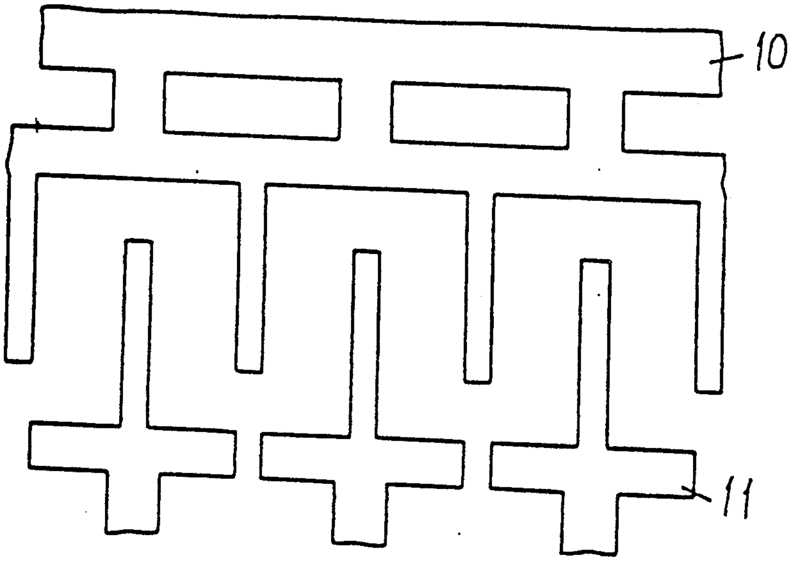

It is confirmed that the heads of the full periphery surrounding type electrode constructions in FIG. 3 A, B, and C as the electrode shape also have a similar effect. Also, the cross talk between the adjacent dots may be almost neglected. It is to be noted that in FIG. 3, the same reference characters are given to the element of the same names.

Embodiment 2

A heating resistor (0.5 through 8 μm in thickness) including Ru02 on an alumina base plate with the glaze layer provided thereon is printed, burned in a line shape (400 μm in width) to form the heating resistor, and then a common electrode and an individual electrode each being composed of a gold electrode (0.5 through 1.0 μm) are provided at an interval of the dot pitch (16.7 μm). The electrode construction at this time is one wherein the end portion of the common electrode was disposed on approximately full periphery of the end portion of the individual electrode as shown in FIG. 2, namely, the electrode construction of an approximately full periphery surrounding type.

Then the glass layer is printed and burned so as to cover the one portion of the resistor and the electrode group to form the abrasion-proof layer (4 through 8 μm in thickness).

According to the results given about the head as in the embodiment 1, the extremely high quality of printing is effected, with the dispersion within ±2% in the printing concentration. Furthermore, it has been found that the printing concentration is 1.2 times high as compared with the head of the conventional simple zigzag type of electrode pattern, with the head being superior in thermal response property. Also, from the printing condition in the actual printing operation, it is found out that the extremely high quality printing may be effected as compared with the conventional simple zigzag type of head, with the first line of color formation being clear.

Embodiment 3

Figure 4:
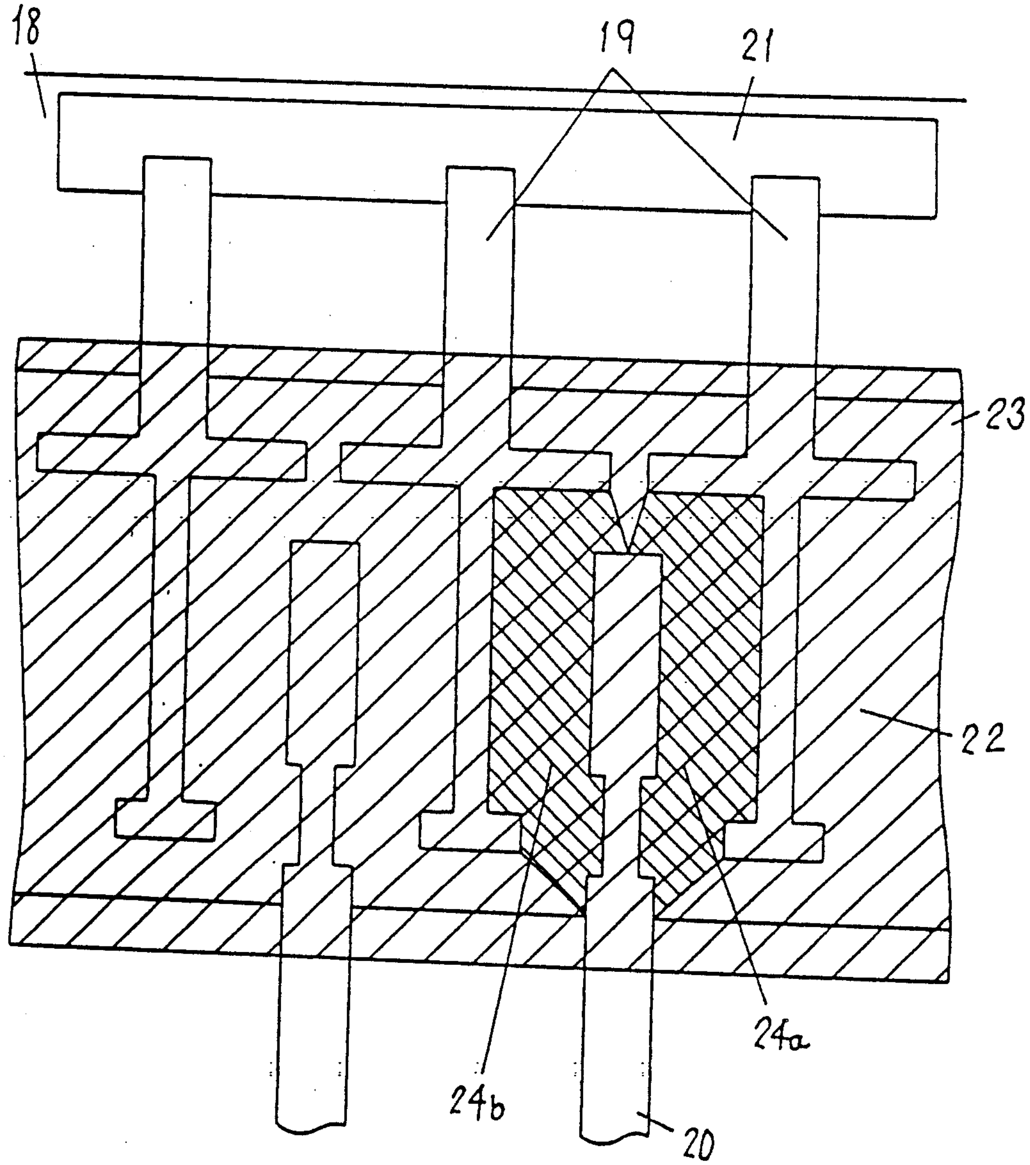
Figure 5:
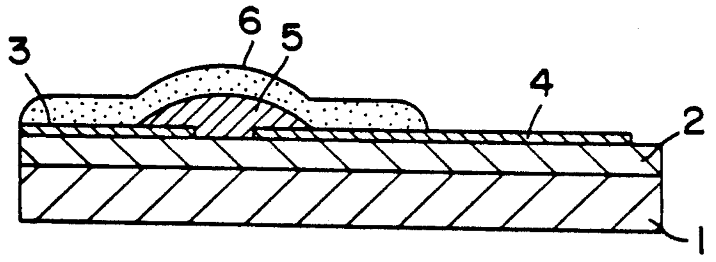
Fig. 5 PRIOR ART
FIG. 5 is a sectional construction view of a conventional thermal head.
Figure 6:
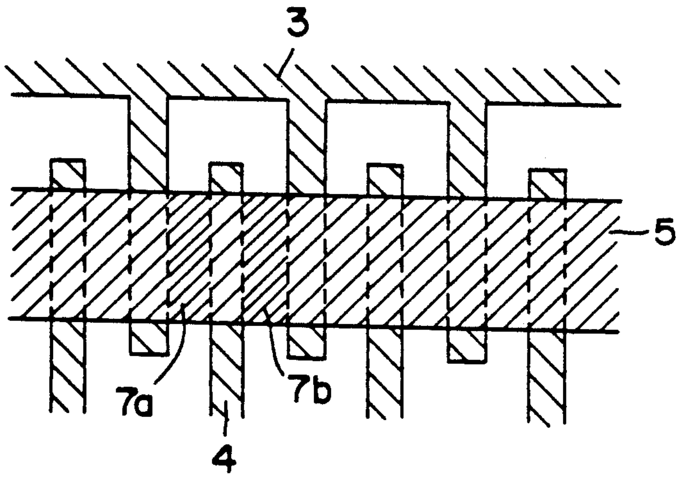
Fig. 6 PRIOR ART
FIG. 6 is a plan view showing the electrode construction of the thermal head of FIG. 5.

FIG. 4 is a plan view for illustrating a thermal head in a different embodiment of the present invention. As shown, the electrodes 19 and 20 for energization use of the first group and the second group are composed of gold (0.5 through 1.0 μm) and are alternately introduced and disposed onto the alumina base plate 18 provided on the glaze layer, are disposed at an interval of dot pitch (167 μm). It is noted that the electrodes 20 are connected with an individual electrodes or electrode end portion, and the conductor electrode 19 are is connected with a common electrode 21. The electrode construction at this time is one wherein the end portion of the first group of individual electrodes 20 is disposed on the full periphery of the end portion of the electrode 19. The end portion for the common electrode use of the second group is disposed, namely, so as to provide the electrode construction of a full periphery surrounding type. Note the perpendicular portions extending substantially perpendicularly from the electrodes 19 between the point where the electrodes 19 are connected to common electrode 21 and the ends thereof. Then, the resistance material for heating use, mainly composed of $RuO_2$, is printed and burned in a line shape (350 μm in width) on the opposite portion of the electrode group so as to form a heating resistor 22 (4 through 8 μm in thickness). Then a glass layer is printed and burned so as to cover one portion of the resistor 22 and the electrode group to form an abrasion proof layer 23 (4 through 8 μm in thickness).

Then, by an energization overload trimming method for adjusting the resistance value by the self-generating Joule heat of the heating resistor, the pulse voltages (5 through 200 V, several μs) are energized for an optional time, separately into the respective heating portions, for example, 24*a* and 14*b* to be formed between the conductor 12*a* of the individual electrode and a pair of adjacent conductor electrodes 13*a* for common electrode use so as to separately adjust the resistance value of the heating portion for arrangement of the resistance values of all the heating portions within ±1%.

After the adjustment of the resistance values the one portion of the electrodes of the second group is connected with the electrode group of the second group through printing and burning of the conductive material of a Cu - resin series as shown in a plan view showing the electrode shape of the thermal head in the drawing so as to form the common electrode 21.

It is to be noted that the resistance value of one dot is a composed value between the heating portions 24*a* and 24*b* to be formed between the end portions of a pair of electrodes 19 adjacent to the end portion of the individual electrode 20 as the second group of electrode groups is turned into the short condition by the common electrode 21. In this case of the present embodiment, the composed resistance value of the heating portion is 1500±1%.

The conventional head with only the electrode pattern being the conventional zigzag type of electrode pattern for the comparison of the head is driven under the conditions of 0.4 W/dot, ¼ duty, 16 ms/cycle to print on the heat sensitive paper, according to the results given about the concentration of the color forming point of the respective dot. The conventional head has a dispersion of ±10% or more in the concentration of the color forming point, with the head of the present invention having the dispersion within ±1.5%, with the printing being extremely high in quality.

Furthermore, the head with the construction of the end portion of the electrodes of the electrode group to be introduced into the heating member being a full periphery surrounding electrode construction is 1.2 times as high in the printing concentration as compared with the head of the conventional simple zigzag type of electrode pattern, thus being superior in thermal response property. Also, from the printing condition in the actual printing operation, the first line color formation is clear and the extremely higher quality of printing may be effected as compared with the conventional simple zigzag head.

If the electrode shape is in the construction of the periphery surrounding type electrode with the common electrode end portion being provided on the periphery of the individual electrode end portion, a similar effect is obtained, and there is not, needless to say, any restriction to the embodiment.

Furthermore, as short materials for common electrode use, there may be used a resin series and a glass flit series containing metals of Cu, Ag, Ag - Pt, Ag - Pd, Ag - Pd - Pt, Au, etc.. Also, the formation may be effected with the non-electrolytic metal plating of Cu, Ni, Au, Cr, etc. without any restriction to the above-described embodiment. Furthermore, the base plate of the thermal head may be an enamel one, and there is not, needless to say, any restriction even to the respective construction materials of the head.

Embodiment 4

After the formation of an electrode layer (2000 through 7000 Å) Ni - Cr by a vacuum thin membrane forming process like evaporation and sputtering on the glazed alumina base plate, the pattern formation of the full periphery surrounding type electrode construction like that of FIG. 2 is formed by a photolitho etching method. Then a resistor layer (1000 through 5000 Å)of Ta - Si is formed in a line shape (350 μm in width) on an electrode construction portion of the full periphery surrounding electrode by a vacuum thin membrane forming process. Furthermore, an abrasion-proof layer (3 through 7 μm) of SiC is formed to cover the resistor layer and the full periphery surrounding type electrode construction portion so as to manufacture the thin membrane type thermal head.

The head of the present embodiment is found to be 1.1 times as high in the printing concentration as compared with the conventional thermal membrane type of thermal head and to be superior in thermal response property. Also, a similar effect is confirmed even in a case where the heating resistor and the electrode are formed upside down.

Furthermore, the present invention is not restricted to the above-described embodiment. The base plate of the thermal head may be an enamel base plate, and furthermore the particular limit is not given, needless to say, with respect to the respective construction materials of the head and the dot resistance value.

As described hereinabove, the present invention relates to the electrode shape for energization use of the thermal head, and provides a thermal head, which is improved in the heating efficiency in the printing operation to increase the thermal response property and to save the power, and is improved in uneven printing concentration of the respective dots for a better gradation recording property, is capable of high quality printing operation, is and higher in reliability. Also, according to the present invention, the photolitho etching step of the resistor layer may be omitted even in the thin membrane type of thermal head, thus making it possible to have the lower cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they would be construed as included.

What is claimed is:

1. A thermal head comprising:

a base plate;

a common electrode on said base plate, said common electrode having a plurality of electrode end portions extending therefrom;

a group of individual electrodes on said base plate, said individual electrodes extending between respective said electrode end portions of said common electrode;

a heating resistor for energization by energization of said individual electrodes together with respective said electrode end portions; and means for substantially surrounding the entire periphery of a said end portion of said common electrode or the entire periphery of a said individual electrode;

wherein said means for substantially surrounding comprises swollen portions on two said end portions of said common electrode adjacent a said individual electrode.

2. The thermal head as set forth in claim 1, wherein:

each of said individual electrodes has a narrowed portion; and said swollen portions on said end portions of said common electrode extend from the ends of said end portions toward said narrowed portion of a said individual electrode.

3. The thermal head as set forth in claim 2, wherein:

said means for substantially surrounding further comprises perpendicular portions extending substantially perpendicularly from said electrode end portions from either side thereof at a position between said ends of said electrode end portions and said common electrode.

4. The thermal head as set forth in claim 1 wherein:

said common electrode and said individual electrodes are disposed on said base plate with said base plate on one side thereof and said resistor on the opposite side thereof; and an abrasion-proof layer is disposed covering said resistor and a portion of said group of individual electrodes.

5. The thermal head as set forth in claim 1 wherein:

said resistor is disposed on said base plate; and an abrasion-proof layer is disposed covering said resistor and a portion of said common electrode.

6. The thermal head as set forth in claim 1, wherein:

said common electrode on said base plate further comprises at least one hollow portion.

7. The thermal head as set forth in any one of claims 1, 9, 11 or 12, wherein:

an abrasion proof layer is disposed on said heating resistor and said electrode end portions of said common electrode and said individual electrodes.

8. The thermal head as set forth in any one of claims 1, 9, 11 or 12, wherein:

an abrasion proof layer is disposed on said heating resistor and said electrode end portions of said common electrode and said individual electrodes; and said heating resistor comprises a plurality of heating resistor portions corresponding to respective electrodes of said first group of electrodes on said base plate, said heating resistor portions having resistor values determined by an energization overload trimming system.

9. A thermal head comprises:

a base plate;

a common electrode on said base plate, said common electrode having a plurality of electrode end portions extending therefrom;

a group of individual electrodes on said base plate, said individual electrodes extending between respective said electrode end portions of said common electrode;

a heating resistor for energization by energization of said individual electrodes together with respective said electrode end portions; and means for substantially surrounding the entire periphery of a said end portion of said common electrode or the entire periphery of a said individual electrode;

wherein said means for substantially surrounding surrounds substantially the entire periphery of a said individual electrode and comprises two end members extending from each said electrode end portion on either side of a respective said individual electrode.

10. The thermal head as set forth in claim 9, wherein:

said means for substantially surrounding further comprises perpendicular portions extending substantially perpendicularly from said individual electrode at a position spaced from the end of said individual electrode.

11. A thermal head comprising:

a base plate;

a common electrode on said base plate, said common electrode having a plurality of electrode end portions extending therefrom;

a group of individual electrodes on said base plate, said individual electrodes extending between respective said electrode end portions of said common electrode;

a heating resistor for energization by energization of said individual electrodes together with respective said electrode end portions; and means for substantially surrounding the entire periphery of a said end portion of said common electrode or the entire periphery of a said individual electrode;

wherein said means for substantially surrounding surrounds substantially the entire periphery of a said individual electrode and comprises perpendicular portions extending substantially perpendicularly from a said individual electrode at a position spaced from the end of a said individual electrode.

12. A thermal head comprising:

a base plate;

a common electrode on said base plate, said common electrode having a plurality of electrode end portions extending therefrom;

a group of individual electrodes on said base plate, said individual electrodes extending between respective said electrode end portions of said common electrode;

a heating resistor for energization by energization of said individual electrodes together with respective said electrode end portions; and means for substantially surrounding the entire periphery of a said end portion of said common electrode at the entire periphery of a said individual electrode;

wherein said means for substantially surrounding forms a part of a said individual electrode and surrounds substantially the entire periphery of a said electrode end portion.

13. The thermal head as set forth in claim 12, wherein:

said means for substantially surrounding comprises two end members extending from each said individual electrode on either side of a respective said electrode end portion.

14. The thermal head as set forth in claim 13, wherein:

said electrode end portion has a narrowed portion thereon; and said means for substantially surrounding further comprises a swollen portion on the ends of said end members of said individual electrode, said swollen portions extending from said end members toward said narrowed portion of said electrode end portion.

* * * * *